(12) United States Patent
Giri et al.

(10) Patent No.: US 8,332,621 B2
(45) Date of Patent: *Dec. 11, 2012

(54) IMPLEMENTATION OF VARIABLE LENGTH INSTRUCTION ENCODING USING ALIAS ADDRESSING

(75) Inventors: Abhijit Giri, Bangalore (IN); Rajiv Nadig, Bangalore (IN)

(73) Assignee: Analog Devices, Inc., Norwood, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/900,993

(22) Filed: Oct. 8, 2010

(65) Prior Publication Data

US 2011/0078423 A1    Mar. 31, 2011

Related U.S. Application Data

(63) Continuation of application No. 11/890,907, filed on Aug. 8, 2007, now Pat. No. 7,836,285.

(51) Int. Cl.
*G06F 9/26* (2006.01)
(52) U.S. Cl. ........................ 712/229; 711/202
(58) Field of Classification Search .................. None
See application file for complete search history.

(56) References Cited

U.S. PATENT DOCUMENTS

| | | | |
|---|---|---|---|
| 5,115,500 A | 5/1992 | Larsen | |
| 5,481,684 A * | 1/1996 | Richter et al. | 712/212 |
| 5,638,525 A * | 6/1997 | Hammond et al. | 712/209 |
| 5,826,074 A * | 10/1998 | Blomgren | 712/234 |
| 5,854,913 A | 12/1998 | Goetz et al. | |
| 5,881,258 A * | 3/1999 | Arya | 712/209 |
| 6,021,265 A * | 2/2000 | Nevill | 712/209 |
| 6,167,459 A * | 12/2000 | Beardsley et al. | 710/3 |
| 6,571,330 B1 | 5/2003 | McGrath et al. | |
| 6,671,791 B1 | 12/2003 | McGrath | |
| 6,820,189 B1 | 11/2004 | Hoffman et al. | |
| 7,047,394 B1* | 5/2006 | Van Dyke et al. | 712/209 |
| 7,149,878 B1* | 12/2006 | Jensen et al. | 712/209 |
| 7,171,543 B1* | 1/2007 | Ronen et al. | 712/209 |
| 7,376,819 B2* | 5/2008 | Mitsuishi et al. | 712/229 |
| 7,421,568 B2* | 9/2008 | Stempel et al. | 712/220 |
| 7,509,480 B2 | 3/2009 | Jensen et al. | |
| 2005/0091439 A1* | 4/2005 | Mohideen et al. | 711/1 |

* cited by examiner

*Primary Examiner* — Eric Coleman
(74) *Attorney, Agent, or Firm* — Bingham McCutchen LLP

(57) ABSTRACT

A digital processor and method of operation utilize an alias address space to implement variable length instruction encoding on a legacy processor. The method includes storing instructions of a code sequence in memory; generating instruction addresses of the code sequence; automatically switching between a first operating mode and a second operating mode in response to a transition in instruction addresses between a first address space and a second address space, wherein addresses in the first and second address spaces access a common memory space; in the first operating mode, accessing instructions in the first address space; in the second operating mode, accessing instructions in the second address space; and executing the accessed instructions of the code sequence. Instructions of different instruction lengths may be utilized in the first and second operating modes.

30 Claims, 8 Drawing Sheets

IMPLEMENTATION OF VARIABLE LENGTH INSTRUCTION ENCODING USING ALIAS ADDRESSING

CROSS REFERENCE TO RELATED APPLICATIONS

This application is a continuation of, and claims priority to and the benefit of, U.S. application Ser. No. 11/890,907, entitled "Implementation of Variable Length Instruction Encoding Using Alias Addressing," filed on Aug. 8, 2007, the entire disclosure of which is incorporated by reference herein.

FIELD OF THE INVENTION

This invention relates to variable length instruction encoding on a legacy processor and, more particularly, to variable length instruction encoding utilizing an alias address space to implement automatic mode switching.

BACKGROUND OF THE INVENTION

Most modern embedded processors employ variable length instruction encoding of their instructions sets to achieve a compact code size. Two approaches have been followed, depending on the existence of a legacy processor.

For a newly-designed instruction set, where code size is considered an important design criterion, mixed size encoding may be utilized. In this case, short and long instructions share the same encoding space. As a result, a mode switch is not necessary for decoding and executing different size instructions.

For instruction sets utilized before code size reduction was undertaken, the encoding space may already be too crowded to permit new op codes. Rather than redesigning the instruction set from scratch, usually a new mode of operation is created in which the processor decodes and executes newly-introduced instructions.

For the second case, before the processor can decode and execute the new instruction types, the processor needs to be put in the new mode. Usually this mode change from legacy mode to the new mode is achieved by setting or resetting a mode bit in a designated configuration register. This approach has shortcomings. The mode bit must be set before the processor starts decoding and executing the new instructions. An instruction in legacy mode must set the bit to switch to the new mode, and vice versa. This implies that if any of the legacy code modules are reused, they must be modified to effect this change of mode. This can have practical limitations, for example, when using precompiled library modules. The mode bit also implies certain overhead in terms of code size as well as cycles required to execute the added mode change instructions. In addition, every time the mode is changed, a pipelined processor must allow the pipeline to drain before it starts decoding instructions from a different mode. This may impact performance if the mode is switched frequently.

Accordingly, there is a need for improved methods and apparatus for variable length instruction encoding in legacy processors.

SUMMARY OF THE INVENTION

According to a first aspect of the invention, a method is provided for operating a digital processor that includes a memory, a program sequencer and an execution unit. The method comprises storing instructions of a code sequence in the memory; generating instruction addresses of the code sequence; automatically switching between a first operating mode and a second operating mode in response to a transition in instruction addresses between a first address space and a second address space, wherein addresses in the first and second address spaces access a common memory space; in the first operating mode, accessing instructions in the first address space; in the second operating mode, accessing instructions in the second address space; and executing the accessed instructions of the code sequence.

The first and second operating modes may utilize instructions of the same or different instruction lengths. In particular, the first operating mode may utilize one or more instruction lengths and the second operating mode may utilize one or more instruction lengths. The instruction lengths in the first and second modes may be the same or different in any combination. In some embodiments, the first mode is configured for execution of instructions of a first instruction length, and the second mode is configured for execution of instructions of the first instruction length, a second instruction length and a third instruction length.

According to a second aspect of the invention, digital processor apparatus comprises a memory configured to store instructions of a code sequence; a program sequencer configured to generate instruction addresses of the code sequence and to automatically switch between a first operating mode and a second operating mode in response to a transition in instruction addresses between a first address space and a second address space, wherein addresses in the first and second address spaces access a common memory space, wherein, in the first operating mode, instructions are accessed in the first address space, and wherein, in the second operating mode, instructions are accessed in the second address space; and an execution unit configured to execute the accessed instructions of the code sequence.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
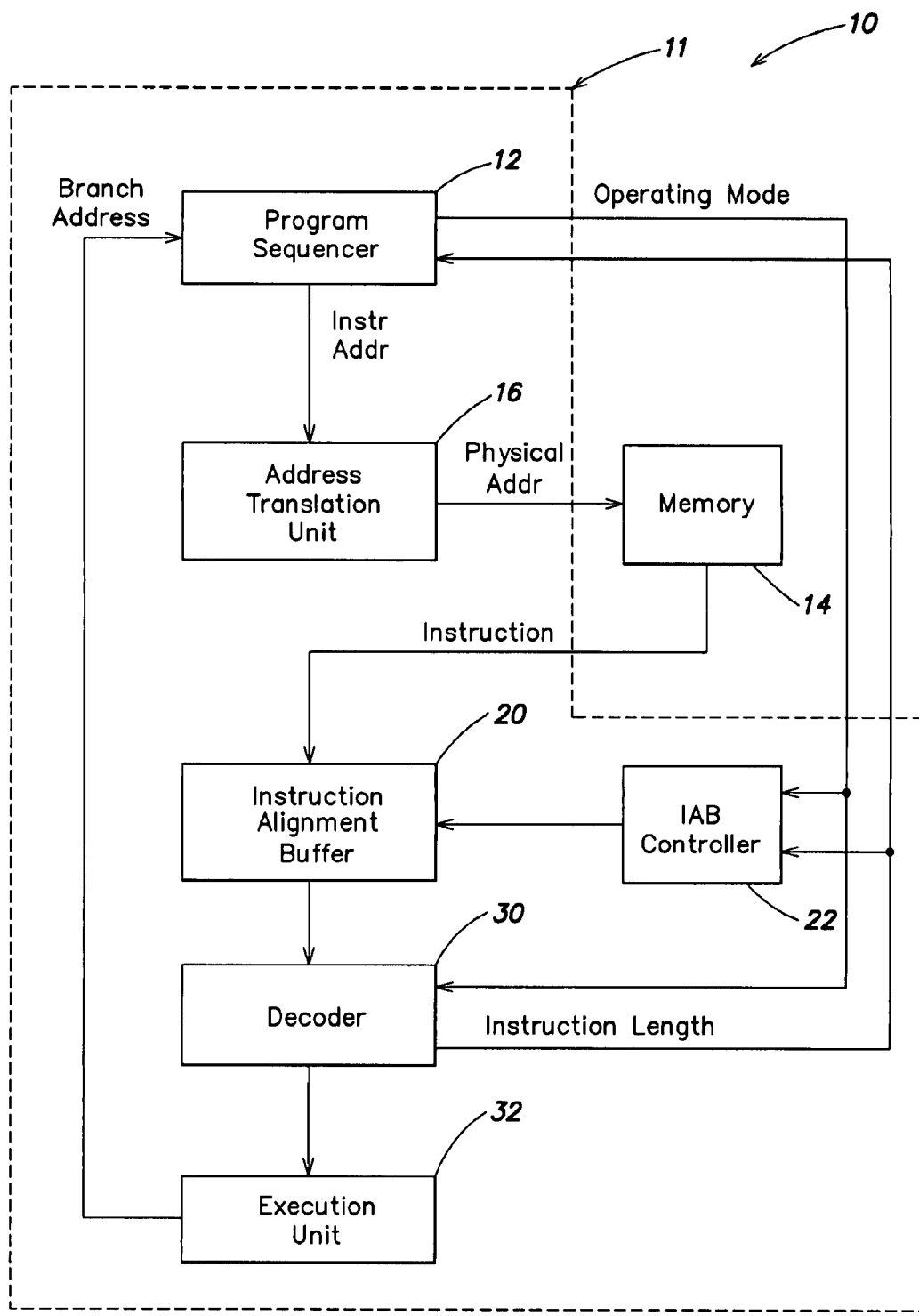
FIG. 1 is a schematic block diagram of digital processor apparatus in accordance with an embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

A schematic block diagram of a digital processor 10 in accordance with an embodiment of the invention is shown in FIG. 1. Digital processor apparatus 10 includes a core processor 11 and a memory 14. A program sequencer 12 generates a sequence of instruction addresses for executing an application program. The program flow may access sequential addresses, but typically includes one or more program structures, such as loops, subroutines, jumps and/or interrupts, which produce non-sequential program flow. The instruction addresses are supplied by program sequencer 12 to an address translation unit 16, which converts the logical instruction addresses to physical addresses for accessing a physical memory. As discussed below, an alias address space may be used to implement automatic mode switching. In some embodiments, a normal word address space and a short word address space are utilized to differentiate between modes. In other embodiments, different virtual pages of a virtual address space are utilized to differentiate between modes.

The physical addresses are provided to memory 14 which returns the instruction to an instruction alignment buffer 20. As discussed below, memory 14 may return more than one instruction per clock cycle, and the instruction alignment buffer 20 selects the correct instruction for execution. An IAB controller 22 controls instruction alignment buffer 20 as described below. A decoder 30 decodes the instruction and provides control signals to an execution unit 32 for executing the current instruction. In the embodiment of FIG. 1, core processor 11 includes program sequencer 12, address translation unit 16, instruction alignment buffer 20, IAB controller 22, decoder 30 and execution unit 32. Operands required by the instructions are accessed separately.

As shown in FIG. 1, program sequencer 12 supplies a Mode signal to IAB controller 22 and decoder 30. A first operating mode and a second operating mode correspond to different instruction sets which may be executed by the digital processor apparatus 10. The first and second operating modes may utilize instructions of the same or different instruction lengths. In particular, the first operating mode may utilize one or more instruction lengths and the second operating mode may utilize one or more instruction lengths. The instruction lengths in the first and second modes may be the same or different in any combination. In some embodiments, the first mode is configured for execution of instructions of a first instruction length, and the second mode is configured for execution of instructions of the first instruction length, a second instruction length and a third instruction length. In these embodiments, the second and third instruction lengths are shorter than the first instruction length.

In some embodiments, the first mode, also called the "legacy" mode, corresponds to an existing instruction set and the second mode, called the "visa" mode, corresponds to a new instruction set. The new instruction set may include instructions of the existing instruction set as well as new instructions. For example, at least some of the new instructions may have shorter instruction lengths than the existing instructions to reduce code size.

The decoder 30 is configured to determine the length of each instruction and to provide an Instruction Length signal to IAB controller 22 and program sequencer 12. The execution unit 32 is configured to supply a branch address to program sequencer 12. As discussed below, a taken branch may trigger mode switching.

In the embodiment of FIG. 1, the first mode utilizes a fixed instruction length of 48 bits. The second mode utilizes variable length instructions, including 48-bit instructions, 32-bit instructions and 16-bit instructions. The program sequencer 12 automatically switches to and between the first mode and the second mode, based on the address of a current instruction being executed. In accordance with embodiments of the invention, alias addresses are used to differentiate between the first mode and the second mode.

Figure 2:
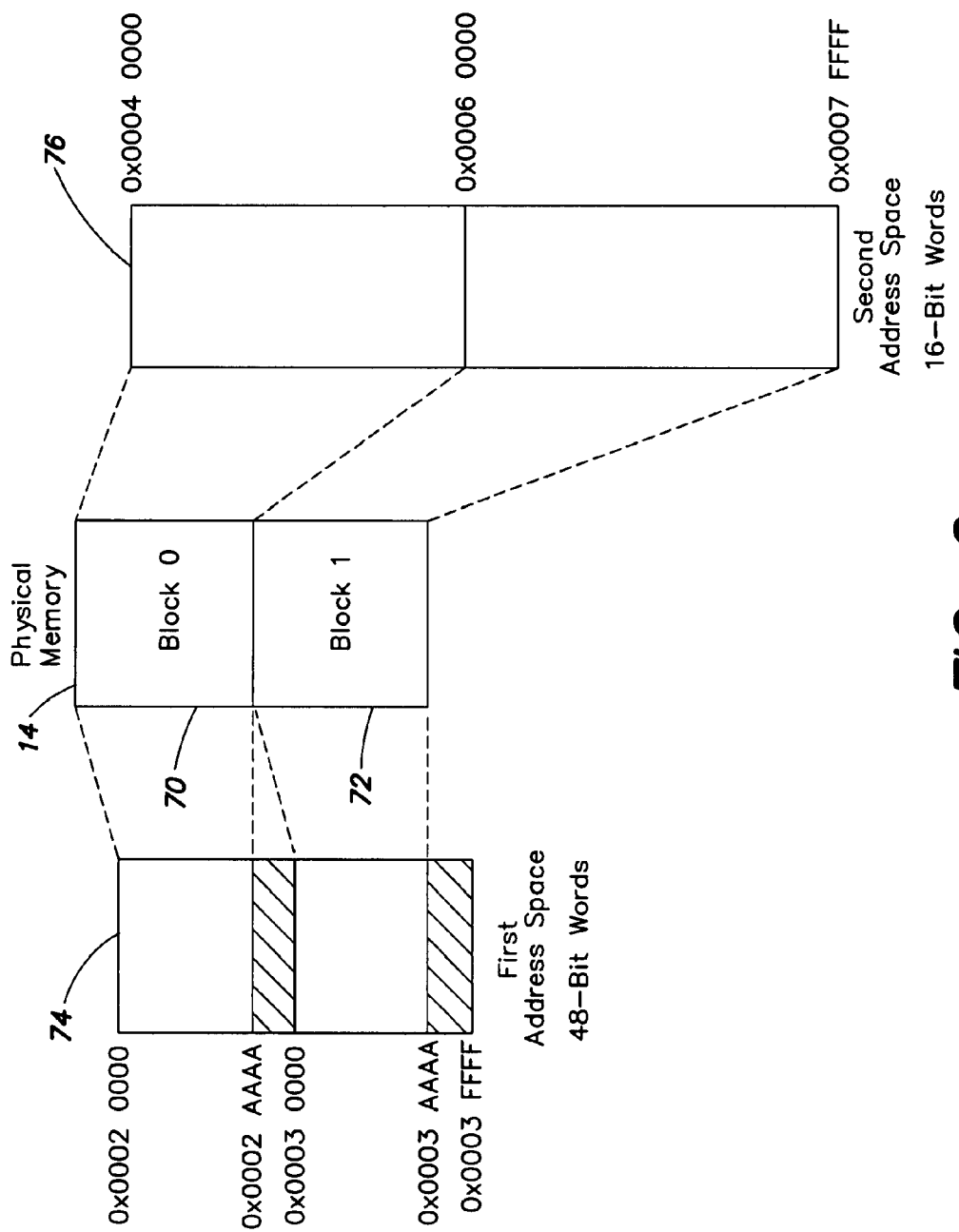
FIG. 2 is a schematic diagram that illustrates a first address space and a second address space that access a common physical memory space.

A schematic diagram that illustrates alias addressing of memory 14 is shown in FIG. 2. In FIG. 2, the physical memory 14 has a capacity of four megabits, divided into blocks 70 and 72 of two megabits each. The memory 14 can be accessed via a first address space 74 or a second address space 76. In this embodiment, the first address space 74 is called a "normal word" address space, and the second address space 76 is called a "short word" address space. In normal word addressing, 48-bit words are read from memory 14 at addresses in a range from 0x0002 0000 to 0x0002 AAAA and 0x0003 0000 to 0x0003 AAAA. In short word addressing, 16-bit words are read from memory 14 at addresses in a range from 0x0004 0000 to 0x0007 FFFF. More than one, typically three, 16-bit words can be read from memory 14 in short word addressing. As shown in FIG. 2, the first address space 74 and the second address space 76 use different address ranges but access a common physical memory space.

In the embodiment of FIG. 2, addresses in first address space and addresses in the second address space access the same range of physical memory addresses. In other embodiments, addresses in first address space and addresses in the second address space access different, but overlapping, ranges of physical memory addresses. Thus, the first address space may be either larger or smaller than the second address space. However, at least part of the first address space and the second address space correspond to the same physical memory space. The second address space is sometimes known as an alias address space with respect to the first address space, or vice versa.

Figure 3:
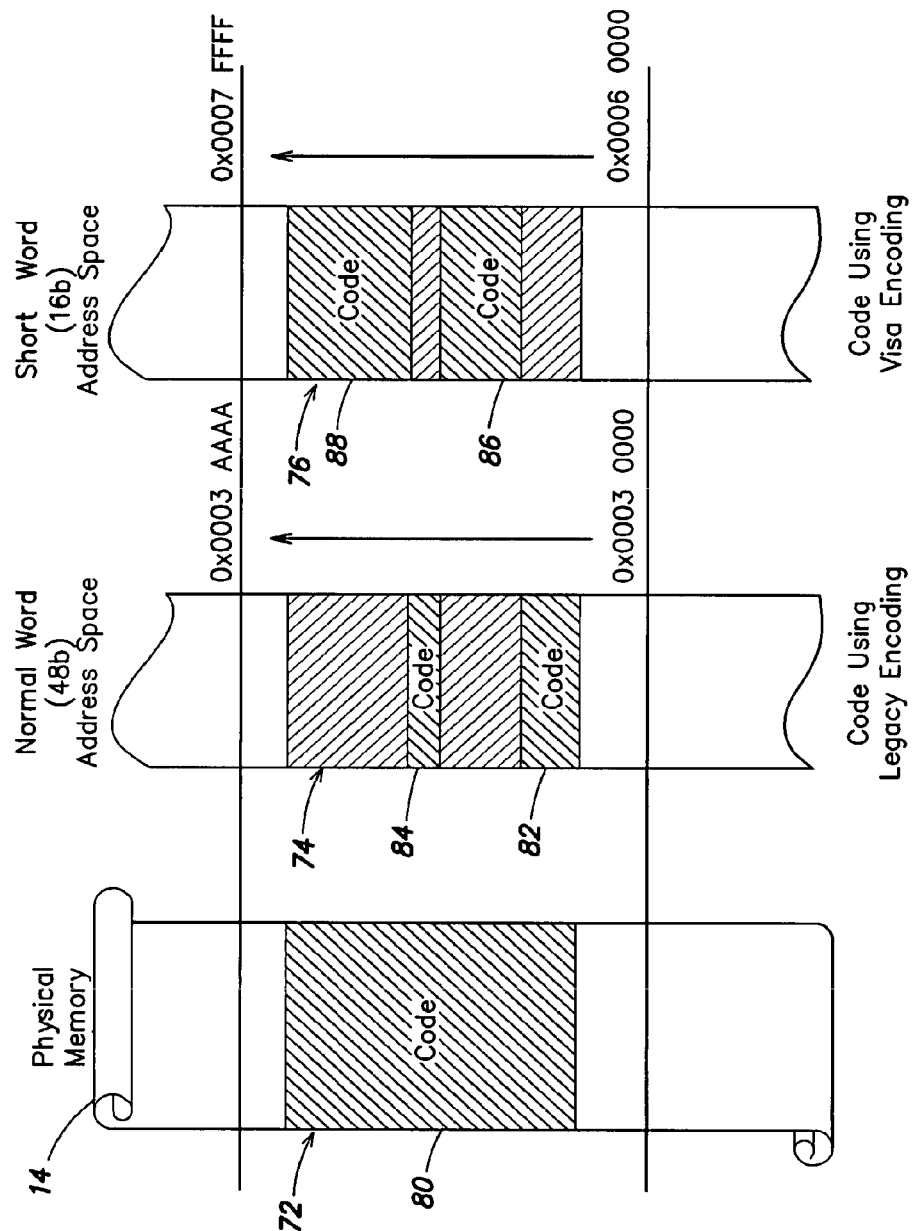
FIG. 3 is a schematic diagram that illustrates instruction addressing in to accordance with an embodiment of the invention.

A schematic diagram that shows legacy encoding and visa encoding using alias addressing in accordance with an embodiment of the invention is shown in FIG. 3. Block 72 of FIG. 2 is shown in FIG. 3. Code 80 for an application program may be stored in a specified address space of physical memory 14. Code 80 includes instructions of legacy code segments 82 and 84 and instructions of visa code segments 86 and 88. As shown, the code segments 82, 84, 86 and 88 occupy different but contiguous areas of physical memory 14. The legacy code segments 82 and 84 are accessed using addresses in the normal word address space, and the visa code segments 86 and 88 are accessed using addresses in the short word address space. As a result, program sequencer 12 can determine the operating mode, depending on whether the current instruction address is in the normal word address space or the short word address space.

Figure 4:
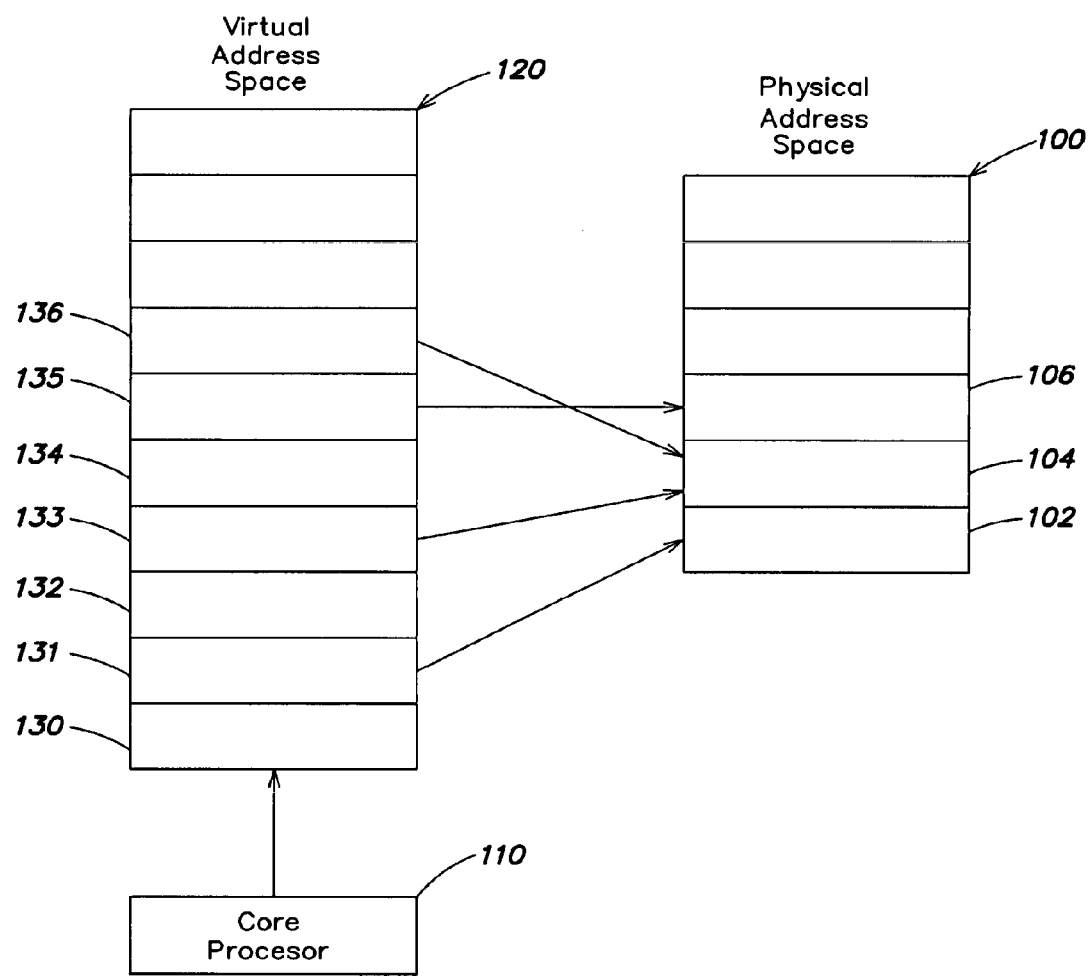
FIG. 4 is a schematic diagram that illustrates virtual memory.

A schematic diagram that illustrates virtual addressing is shown in FIG. 4. A physical address space 100 includes physical pages 102, 104, 106, etc. A core processor 110 operates by accessing a virtual address space 120, which is typically larger than physical address space 100. Virtual address space 120 may include virtual pages 130, 131, 132, 133, 134, 135, 136, etc. When the core processor 110 accesses a location in virtual address space 120, the virtual address is converted to a physical address by address translation unit 16 (FIG. 1), and the corresponding physical memory location is accessed. In some cases, the required data is accessed in a lower level memory, such as disk storage, and transferred to physical memory. The mapping between virtual pages and physical pages is maintained in a page table. After the page table is appropriately configured, in the example of FIG. 4, virtual page 131 points to physical page 102, virtual pages 133 and 136 point to physical page 104, and virtual page 135 points to physical page 106. As shown, two or more virtual pages may point to the same physical page.

In accordance with embodiments of the invention, instructions of a code sequence may be stored in an area of physical memory, such as physical page 104. Core processor 110 generates instruction addresses of the code sequence as virtual addresses. The virtual addresses of the code sequence corresponding to a first operating mode may be in virtual page 133, and virtual addresses of the code sequence corresponding to a second operating mode may be in virtual page 136. For example, instructions in virtual page 133 may have the same instruction length, and instructions in virtual page 136 may have mixed instruction lengths. When the code sequence branches from an instruction address in virtual page 133 to an instruction address in virtual page 136, the core processor 110 detects the change in the address space of the branch target, if any, and automatically switches from the first operating mode to the second operating mode. Similarly, when the code sequence in virtual page 136 branches to an instruction in virtual page 133, core processor 110 detects the change in the address space of the branch target, if any, and automatically switches from the second operating mode to the first operating mode. In the first and second operating modes, instructions may be accessed differently due to different instruction lengths.

Figure 5:
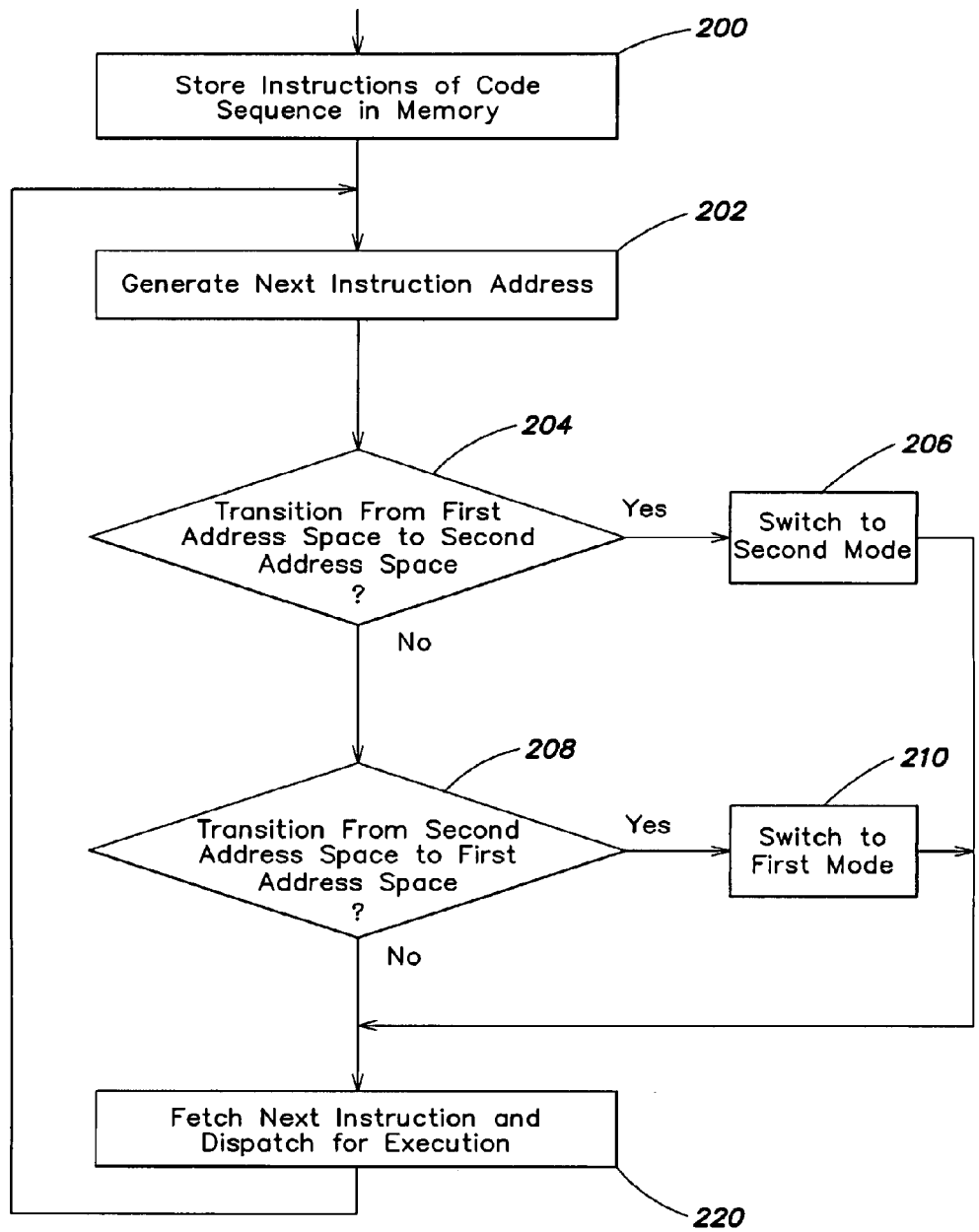
FIG. 5 is a flow diagram that illustrates a method of processor operation in accordance with an embodiment of the invention.

A flow chart of a method for operating a digital processor apparatus in accordance with an embodiment of the invention is shown in FIG. 5. In step 200, instructions of a code sequence are stored in memory, such as memory 14 shown in FIG. 1. Instructions of the first operating mode and instructions of the second operating mode may be stored in contiguous areas of physical memory 14. When the code sequence is called for execution, an instruction address is generated in step 202.

It should be evident that, at reset, the sequencer should be initialized to operate in a given mode. Since the processors are normally designed to be backward compatible, in this embodiment, the sequencer is initialized to legacy operating mode at reset.

In step 204, a determination is made as to whether the next instruction address represents a transition from the first address space to the second address space. If the next instruction address represents a transition from the first address space to the second address space, the program sequencer 12 (FIG. 1) automatically switches to the second operating mode in step 206 and proceeds to step 220. If the next instruction address does not represent a transition from the first address space to the second address space, a determination is made in step 208 whether the next instruction address represents a transition from the second address space to the first address space. If the next instruction address represents a transition from the second address space to the first address space, the program sequencer 12 automatically switches to the first operating mode in step 210 and proceeds to step 220. If the next instruction address does not represent a transition from the second address space to the first address space, the process proceeds to step 220 without mode switching. The transition between address spaces may be indicated by a branch instruction that branches between address spaces.

In step 220, the program sequencer 12 fetches the next instruction using the appropriate operating mode and dispatches the instruction to the execution unit for execution. The process then returns to step 202 to generate the next instruction address.

In the embodiment described above, the first, or legacy, operating mode is configured for execution of instructions of a first instruction length fixed at 48 bits, and the second, or visa, operating mode is configured for execution of instructions having variable instruction lengths, including 48-bit instructions, 32-bit instructions and 16-bit instructions. The memory 14 may be organized as four columns of 16-bit words. In the legacy mode, a 48-bit instruction is fetched on each clock cycle and is supplied to the core processor 11 for decoding and execution. Because of the memory organization, an instruction alignment buffer 20 is used to align 48-bit instructions that are stored in different rows of memory 14. Since all instructions are 48 bits, instruction length information is not required and the program counter is incremented by a value corresponding to 48-bits on each clock cycle.

In the visa mode, instructions of 48 bits, 32 bits and 16 bits are mixed in memory 14. The mixed instructions are stored in consecutive locations of memory 14 in order to achieve high code density. When executing a code sequence, the instruction length of the next instruction is not known in advance. Thus, referring to FIG. 1, when an instruction is partially decoded by decoder 30, the instruction length is determined and the instruction length information is provided to IAB controller 22 and program sequencer 12. The instruction length information is used by IAB controller 22 to control alignment of the next instruction to be provided to decoder 30. The instruction length information is used by program sequencer 12 to increment a program counter by a value corresponding to one, two or three 16-bit words, depending on the decoded length of the current instruction.

Because the length of the next instruction is not known in advance, a number of words corresponding to the maximum length instruction is fetched from memory 14 on each clock cycle. In the above example, three 16-bit words are fetched from memory 14 on each clock cycle in the visa mode. The instruction alignment buffer 20 uses the instruction length information from decoder 30 to align instructions on each clock cycle. Since the length of the next instruction is not known in advance, three 16-bit words are provided by instruction alignment buffer 20 to decoder 30 on each clock cycle.

Figure 6:
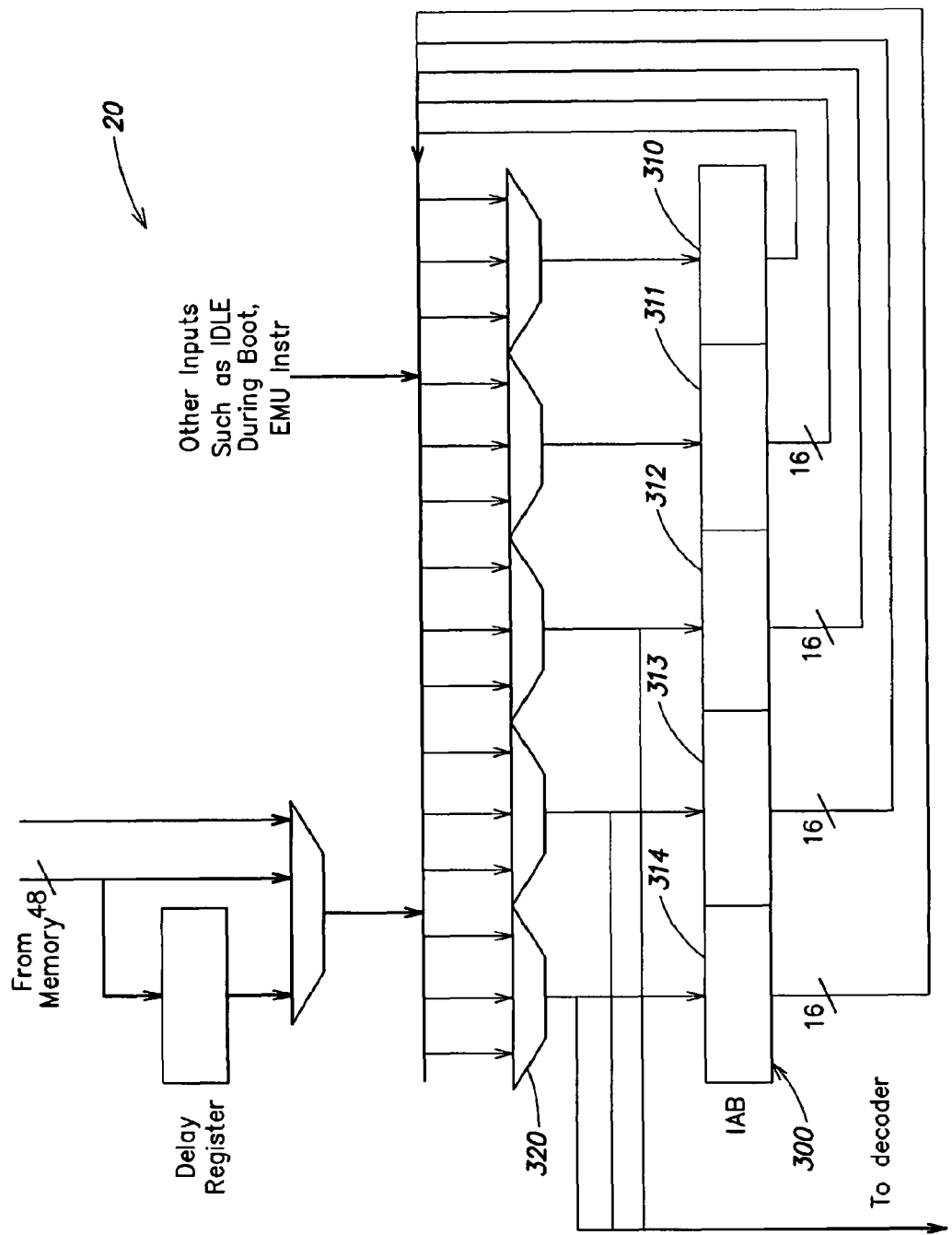
FIG. 6 is a schematic block diagram that illustrates an instruction alignment buffer in accordance with an embodiment of the invention.

A block diagram of an embodiment of instruction alignment buffer 20 is shown in FIG. 6. A buffer 300 has a capacity of five 16-bit words and includes 16-bit locations 310, 311, 312, 313 and 314. A mux (multiplexer) 320 supplies data to each 16-bit location of buffer 300. The inputs to buffer 300 may be from memory, from the outputs of buffer 300, or from other input sources. The outputs of one 16-bit location can be written to a different 16-bit location to effectively shift the instructions in buffer 300.

In the first, or legacy, operating mode, three 16-bit words are read from memory and supplied to decoder 30 on each clock cycle. Because each instruction is 48 bits in the legacy mode, instruction alignment is not required.

In the second, or visa, operating mode, three 16-bit words are read from memory and written to buffer 300 on each clock cycle. The 48 bits read from memory may contain a mixture of instruction lengths on any clock cycle. Because the content of the three 16-bit words is not known in advance, the 48 bits are supplied to decoder 30. After partial decoding, the instruction length is determined, based on specified instruction coding. The fetch operation is delayed if buffer 300 cannot accommodate three new 16-bit words read from memory.

Figure 7:
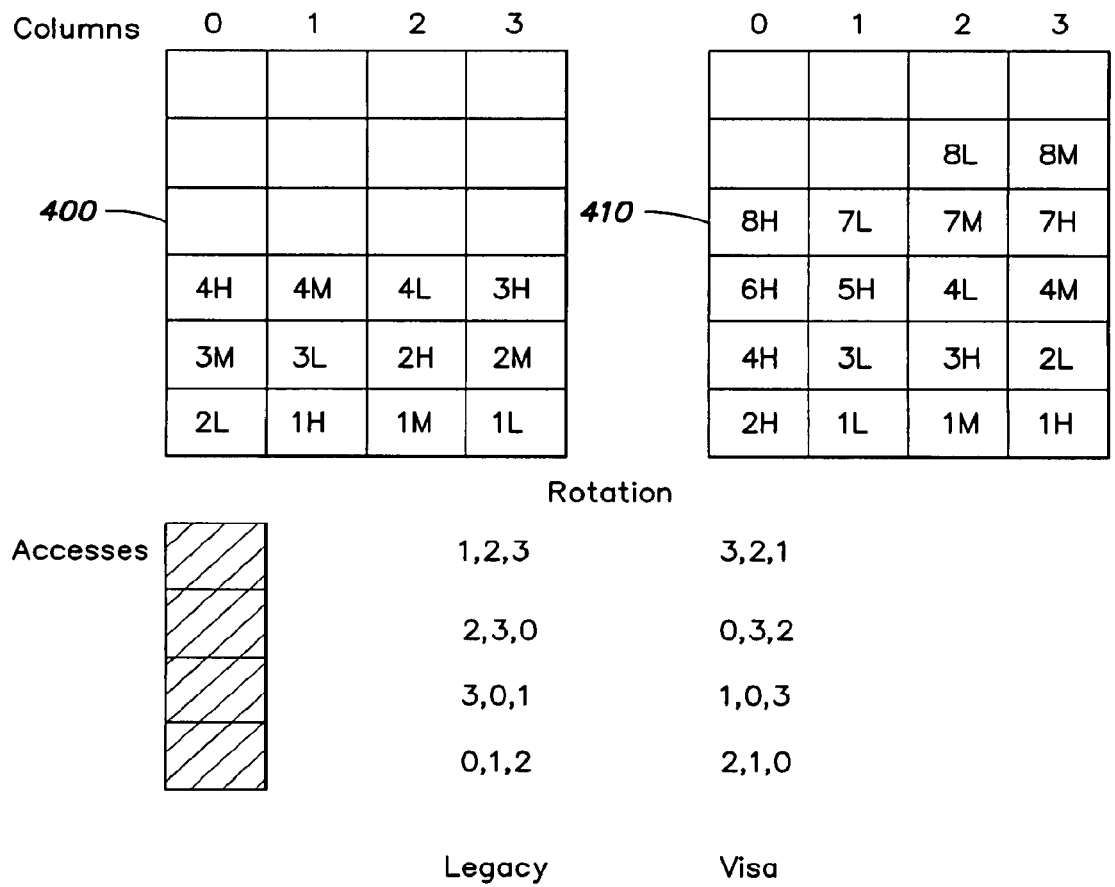
FIG. 7 is a schematic diagram that illustrates memory accesses in legacy and visa modes in accordance with an embodiment of the invention.
Figure 8:
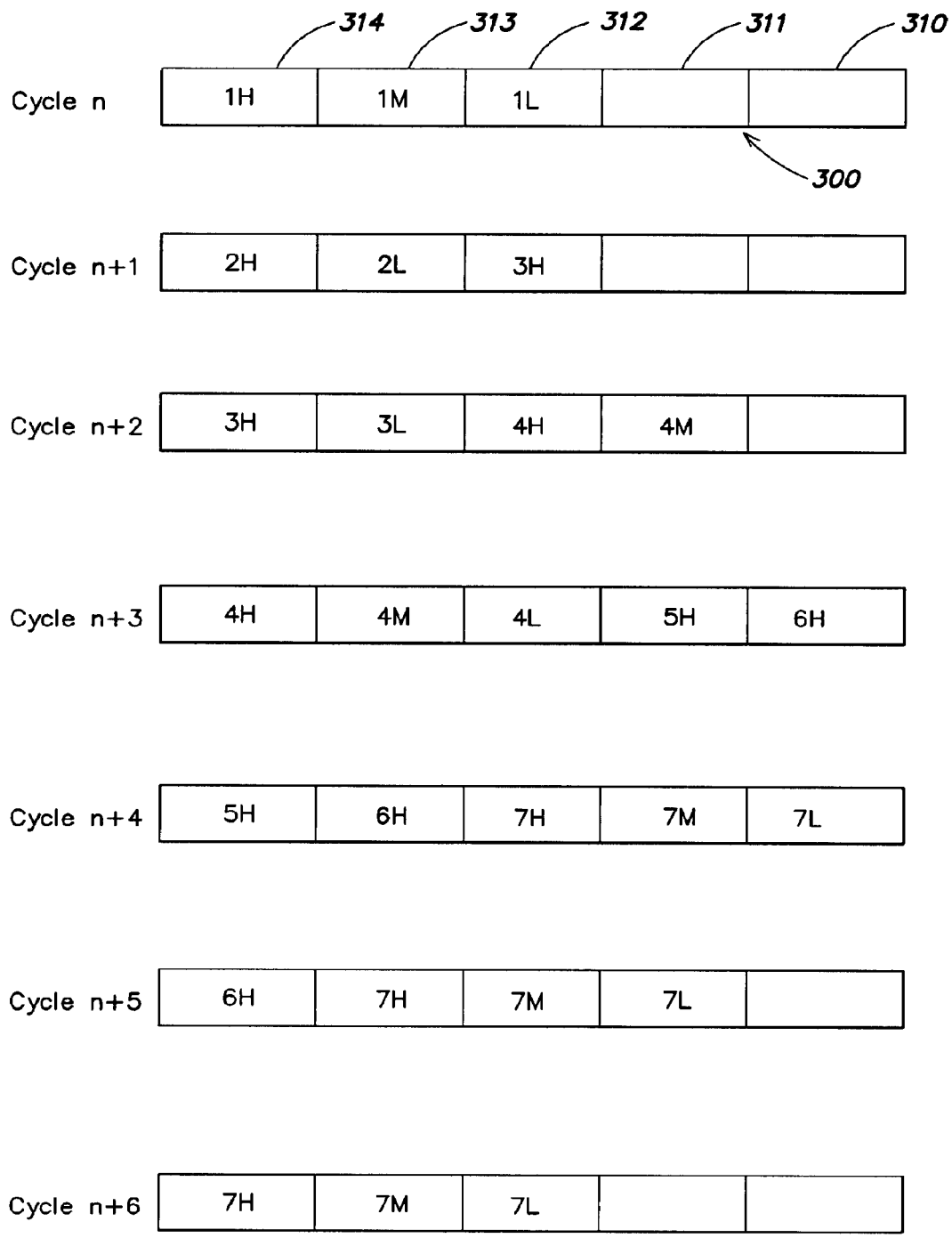
FIG. 8 is a schematic diagram that illustrates instruction alignment in accordance with an embodiment of the invention.

A memory block 400 containing 48-bit instructions for operation in the legacy mode is shown in FIG. 7. In this embodiment, the memory block 400 includes four columns of 16-bit words. A memory block 410 containing mixed length instructions for operation in the visa mode is also shown in FIG. 7. In this embodiment, high, mid and low order 16-bit words are arranged differently in legacy and visa modes (different rotation). Instructions are fetched from memory block 410, placed in buffer 300 and shifted in buffer 300 as shown in FIG. 8, in response to the instruction length signal. The contents of buffer 300 on successive clock cycles are shown in FIG. 8. The mixed length instructions are executed on successive clock cycles.

If the instruction is decoded as a 48-bit instruction, the three 16-bit words of the instruction are deleted from locations 312, 313 and 314 of buffer 300. Three 16-bit words read from memory on the next clock cycle are written to the high order locations 312, 313 and 314 of buffer 300 (see cycles n and n+1 in FIG. 8).

If the instruction is decoded as a 32-bit instruction, the two 16-bit words of the instruction are deleted from locations 313 and 314 of buffer 300 and the remaining 16-bit words in buffer 300 are shifted two locations to the left (see cycles n+1 and n+2 in FIG. 8).

If the instruction is decoded as a 16-bit instruction, the 16-bit word in the high order location 314 of buffer 300 is deleted and the remaining 16-bit words in buffer 300 are shifted one location to the left (see cycles n+4 and n+5 of FIG. 8). Thus, the operation of instruction alignment buffer 20 depends on the decoded instruction length of the current instruction.

Fetching of instructions is throttled, or stalled, on any cycle when the buffer 300 cannot accommodate the three 16-bit words fetched from memory. An example is shown in FIG. 8. In cycle n+6, buffer 300 is unable to accommodate 16-bit words 8H, 8M and 8L (see FIG. 7) and fetching is throttled.

An assembler may be configured to operate in the legacy mode or in the visa mode. Source code assembled with the assembler operating in visa mode produces binary code which may have a mix of instructions of various lengths. All the instructions are placed in the short word address space of memory 14. The same code assembled in legacy mode produces binary code having instructions of uniform length of 48 bits. The entire code thus assembled is placed in a normal word address space of memory 14. The two types of code can be linked together. The executable file contains the instructions assembled in the legacy mode as well as the instructions assembled in the visa mode, with the branch target references resolved in such a way that a branch target to a code section created in legacy mode is a normal word address and a branch target to a code section created in visa mode is a short word address. As mentioned earlier, the processor is initialized to the legacy mode at reset. Accordingly, the reset ISR (Interrupt SubRoutine), which is executed by the processor immediately after a reset event, is assembled in legacy mode. The two address spaces enable the program sequencer to detect the type of code and to dynamically switch the mode of operation to correctly decode instructions in different operating modes.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for operating a digital processor that includes a memory, a program sequencer and an execution unit, comprising:
    storing instructions of a code sequence in the memory;
    generating instruction addresses of the code sequence;
    detecting, within the generated instruction addresses, an address transition between a first alias address space and a second alias address space, wherein addresses in the first and second alias address spaces access a common memory space and wherein each physical location in the common memory space may be accessed by an address in either the first alias address space or the second alias address space;
    automatically switching between a first operating mode and a second operating mode in response to the detected transition;
    in the first operating mode, accessing instructions in the first alias address space;
    in the second operating mode, accessing instructions in the second alias address space; and
    executing the accessed instructions of the code sequence.

2. A method as defined in claim 1, wherein automatically switching comprises switching from the first mode to the second mode in response to a transition in instruction addresses from the first address space to the second address space and switching from the second mode to the first mode in response to a transition in instruction addresses from the second address space to the first address space.

3. A method as defined in claim 1, wherein accessing instructions in the first address space comprises accessing instructions of a first instruction length and wherein accessing instructions in the second address space comprises accessing instructions of a second instruction length.

4. A method as defined in claim 3, wherein accessing instructions in the second address space further comprises accessing instructions of the first instruction length in the second address space.

5. A method as defined in claim 4, further comprising determining a current instruction length in the second mode and aligning a next instruction based on a current instruction length.

6. A method as defined in claim 5, wherein aligning instructions comprises shifting instructions in an instruction alignment buffer in response to the current instruction length.

7. A method as defined in claim 3, wherein accessing instructions comprises accessing a number of bits corresponding to a longest instruction length on each clock cycle.

8. A method as defined in claim 3, wherein accessing instructions in the second address space further comprises accessing instructions of the first instruction length and instructions of a third instruction length in the second address space. A method as defined in claim 3, wherein accessing instructions in the second address space further comprises accessing instructions of the first instruction length and instructions of a third instruction length in the second address space.

9. A method as defined in claim 8, wherein the first instruction length is greater than the second and third instruction lengths.

10. A method as defined in claim 1, wherein automatically switching comprises detecting a target address of a branch instruction and switching between the first and second modes when the target address of the branch instruction represents a transition between the first address space and the second address space.

11. A method as defined in claim 8, wherein accessing instructions in the second address space comprises accessing instructions of mixed instruction lengths in consecutive locations of the memory.

12. A method as defined in claim 3, wherein accessing instructions in the second address space further comprises accessing instructions of a third instruction length in the second address space.

13. A method as defined in claim 8, wherein the first instruction length is 48 bits, the second instruction length is 32 bits and the third instruction length is 16 bits.

14. A method as defined in claim 1, wherein the first address space is a normal word address space and the second address space is a short word address space.

15. A method as defined in claim 1, wherein the first address space is a first virtual page of a virtual address space and the second address space is a second virtual page of the virtual address space.

16. Digital processor apparatus comprising:
a memory configured to store instructions of a code sequence;
a program sequencer configured to (i) generate instruction addresses of the code sequence, (ii) detect an address transition, within the generated instruction addresses, between a first alias address space and a second alias address space, and (iii) automatically switch between a first operating mode and a second operating mode in response to the detected transition, wherein addresses in the first and second alias address spaces access a common memory space, and wherein each physical location in the common memory space may be accessed by an address in either the first alias address space or the second alias address space , and wherein, in the first operating mode, instructions are accessed in the first alias address space, and wherein, in the second operating mode, instructions are accessed in the second alias address space; and
an execution unit configured to execute the accessed instructions of the code sequence.

17. Digital processor apparatus as defined in claim 16, wherein the program sequencer is configured to switch from the first mode to the second mode in response to a transition in instruction addresses from the first address space to the second address space and is configured to switch from the second mode to the first mode in response to a transition in instruction addresses from the second address space to the first address space.

18. Digital processor apparatus as defined in claim 16, wherein the program sequencer is configured to access instructions of a first instruction length in the first address space and to access instructions of a second instruction length in the second address space.

19. Digital processor apparatus as defined in claim 18, wherein the program sequencer is further configured to access instructions of the first instruction length in the second address space.

20. Digital processor apparatus as defined in claim 18, wherein the program sequencer is further configured to access instructions of the first instruction length and a third instruction length in the second address space.

21. Digital processor apparatus as defined in claim 20, wherein the first instruction length is greater than the second and third instruction lengths.

22. Digital processor apparatus as defined in claim 20, wherein the first instruction length is 48 bits, the second instruction length is 32 bits and the third instruction length is 16 bits.

23. Digital processor apparatus as defined in claim 18, wherein the program sequencer is configured to fetch a number of bits corresponding to a maximum length instruction on each clock cycle.

24. Digital processor apparatus as defined in claim 18, further comprising a decoder to determine a current instruction length in the second mode and an instruction alignment buffer to align a next instruction in response to the current instruction length.

25. Digital processor apparatus as defined in claim 24, wherein the instruction alignment buffer is configured to shift instructions in response to the current instruction length.

26. Digital processor apparatus as defined in claim 16, wherein the program sequencer is configured to detect a target address of a branch instruction and to switch between the first mode and the second mode in response to detecting that the target address of the branch instruction represents a transition between the first address space and the second address space.

27. Digital processor apparatus as defined in claim 16, wherein the first address space is a normal word address space and the second address space is a short word address space.

28. Digital processor apparatus as defined in claim 16, wherein the first address space is a first virtual page of a virtual address space and the second address space is a second virtual page of the virtual address space.

29. A method for operating a digital processor that includes a memory, a program sequencer and an execution unit, comprising:
storing instructions of a code sequence in the memory;
generating instruction addresses of the code sequence;
detecting, within the generated instruction addresses, a branch between a first alias address space and a second alias address space, wherein addresses in the first and second alias address spaces access a common memory space and wherein each physical location in the common memory space may be accessed by an address in either the first alias address space or the second alias address space;
automatically switching between a first operating mode and a second operating mode in response to the detected branch;
in the first operating mode, accessing instructions of a first instruction length in the first alias address space;
in the second operating mode, accessing instructions of the first instruction length, a second instruction length and a third instruction length in the second alias address space; and
executing the accessed instructions of the code sequence.

30. The method as defined in claim 1, wherein the instructions in the common memory space accessed by the address in the first alias address space and the instructions in the common memory space accessed by the address in the second alias address space are freely interleaved.

* * * * *